(12) United States Patent
Chang et al.

(10) Patent No.: US 11,476,060 B1
(45) Date of Patent: Oct. 18, 2022

(54) MANUAL SERVICE DISCONNECT FOR IN-VEHICLE ELECTRIC CURRENT

(71) Applicant: JESS-LINK PRODUCTS CO., LTD., New Taipei (TW)

(72) Inventors: Hsu-Feng Chang, New Taipei (TW); Lin Huang, Guiping (CN)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 0 days.

(21) Appl. No.: 17/308,736

(22) Filed: May 5, 2021

(51) Int. Cl.
*H01H 9/02* (2006.01)
*B60R 16/02* (2006.01)

(52) U.S. Cl.
CPC .............. *H01H 9/02* (2013.01); *B60R 16/02* (2013.01)

(58) Field of Classification Search
CPC . H01H 9/02; B60R 16/02; H05K 5/00; H01R 43/20; H01R 13/66
USPC ................. 200/293; 174/53, 54, 66, 57, 135
See application file for complete search history.

(56) References Cited

U.S. PATENT DOCUMENTS

| 10,322,635 B2 | 6/2019 | Meinl et al. | |
| 2021/0076509 A1* | 3/2021 | Farinola | H05K 5/006 |

FOREIGN PATENT DOCUMENTS

| CN | 105811184 A | 7/2016 |
| CN | 110707482 A | 1/2020 |
| CN | 112152000 A | 12/2020 |
| EP | 0630078 B1 | 8/1998 |
| WO | 2019062980 A1 | 4/2019 |

OTHER PUBLICATIONS

Office Action dated May 31, 2022 of the corresponding Taiwan patent application No. 110112761.

* cited by examiner

*Primary Examiner* — Edwin A. Leon
*Assistant Examiner* — Iman Malakooti
(74) *Attorney, Agent, or Firm* — Chun-Ming Shih; HDLS IPR Services

(57) ABSTRACT

A manual service disconnect for the in-vehicle electric current, which has a switch seat, a safety plug assembly, and a protection cover. The switch seat has a seat portion and a plug holder. The plug holder is provided with multiple power legs. The seat portion is hollow inside and has a plug port and a wire opening. The plug holder is disposed in the seat portion and faces the plug port. The power legs project from the wire opening. The safety plug assembly has a plug portion matching the seat portion and a plug head disposed on the plug portion. The protection cover is disposed on the seat portion and covers the wire opening to cover the power legs for protection.

9 Claims, 6 Drawing Sheets

MANUAL SERVICE DISCONNECT FOR IN-VEHICLE ELECTRIC CURRENT

BACKGROUND

Technical Field

The present disclosure relates to a safety switch and in particular to a manual service disconnect for an in-vehicle electric current.

Description of Related Art

The power supply system used in the current hybrid electric vehicle (abbreviated as HEV) or the plug-in HEV (abbreviated as PHEV) is usually equipped with a mini manual service disconnect, abbreviated as Mini MSD, which is used as a reliable safety switch to ensure the disconnection of the power system for the vehicle during the maintenance.

However, in the related art of Mini MSD, the connecting structure for outputting the external current is designed to expose the power leadscrews which are clamped by the power clamp for facilitating the direct clamping of the power clamp. Nevertheless, such design still causes safety concern and needs to be improved.

In view of this, the inventor pays special attention to research with the application of related theory and tries to improve and overcome the above disadvantages regarding the related art, which becomes the improvement target of the inventor.

SUMMARY

The primary objective of the present disclosure is to provide a manual service disconnect for an in-vehicle electric current, which is further provided with a protection cover to prevent user from carelessly contacting.

The another objective of the present disclosure is to provide a manual service disconnect for an in-vehicle electric current, which does not influence the wire routing under the condition of adding the protection cover.

To achieve the above objectives, the present disclosure provides a manual service disconnect for an in-vehicle electric current, which includes a switch seat, a safety plug assembly, and a protection cover. The switch seat has a seat portion and a plug holder; the plug holder is provided with multiple power legs; the seat portion is hollow inside and has a plug port and a wire opening; the plug holder is disposed in the seat portion and faces the plug port; the power legs project from the wire opening. The safety plug assembly has a plug portion matching the seat portion and a plug head disposed in the plug portion. The protection cover is disposed on the seat portion and covers the wire opening to cover the power legs. In this way, the accident caused by contacting with the power legs due to user's carelessness may be prevented.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
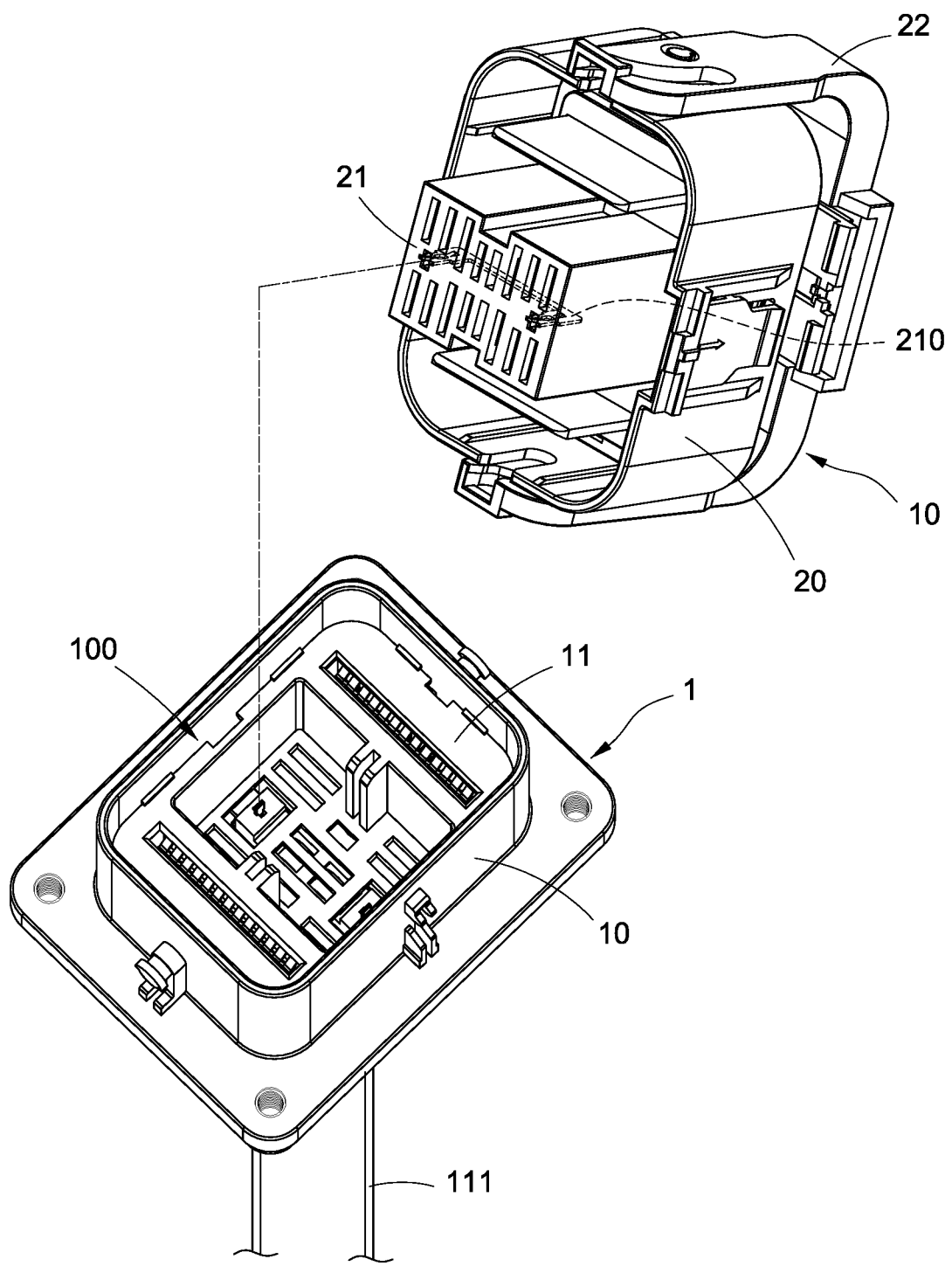
FIG. 1 is a respective exploded view of the switch seat and the safety plug assembly of the present disclosure.

Please refer to FIG. 1, which is a respective exploded view of the switch seat and the safety plug assembly of the present disclosure. The present disclosure provides a manual service disconnect for an in-vehicle electric current, which includes a switch seat 1 and a safety plug assembly 2 that may be assembled with or detached from the switch seat 1.

Figure 2:
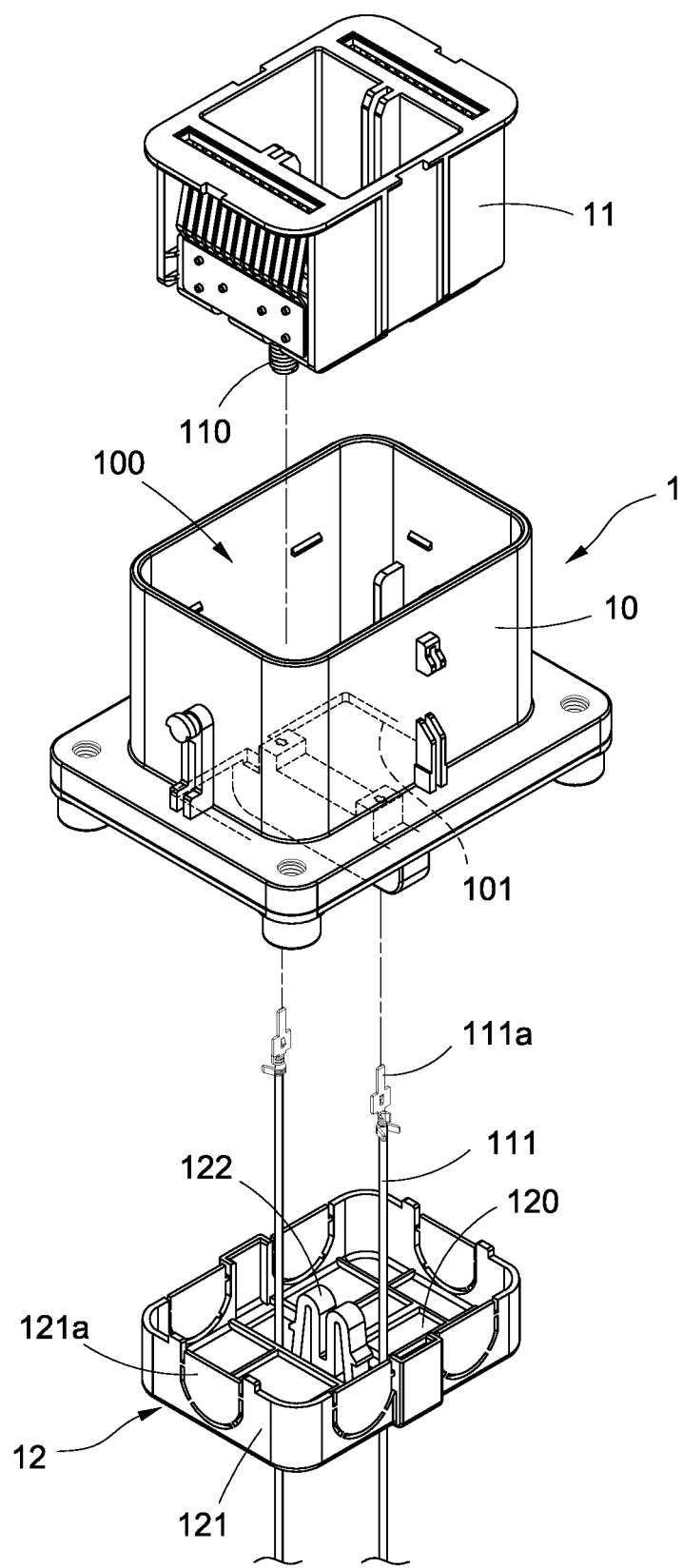
FIG. 2 is a respective exploded view of the switch seat of the present disclosure.
Figure 3:
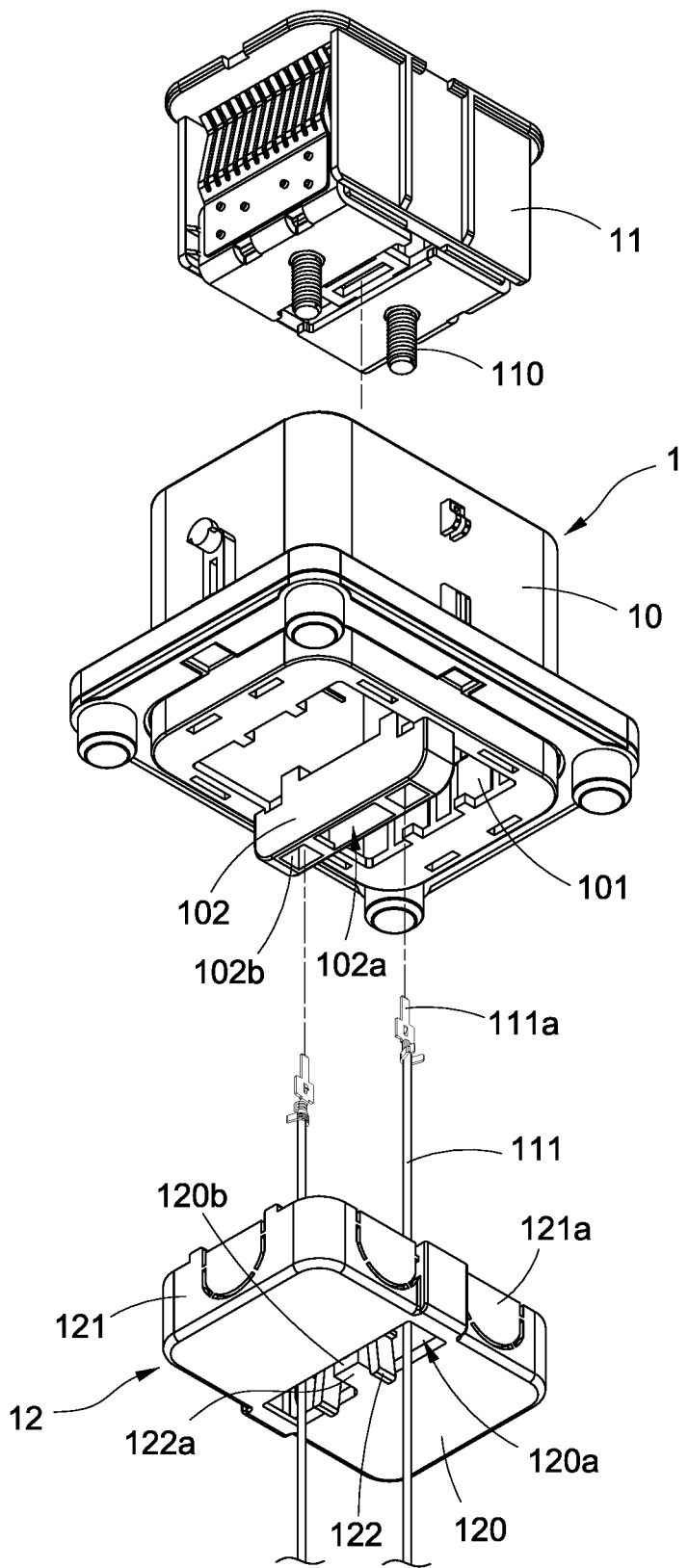
FIG. 3 is another respective exploded view of the switch seat of the present disclosure.

As shown in FIGS. 2 and 3, the switch seat 1 includes a seat portion 10 and a plug holder 11 disposed in the seat portion 10. The plug holder 11 is provided with a plurality of power legs 110 protruding from the backside opposite to the plug opening of the plug holder 11. The seat portion 10 is hollow inside and is perforated to include a plug port 100 and a wire opening 101. The plug holder 11 is disposed in the seat portion 10 such that the plug opening of the plug holder 11 is disposed toward the plug port 100 and the power legs 110 of the plug holder 11 project from the wire opening 101. Moreover, the plug holder 11 is disposed for two power wires 111 to be inserted through the wire opening 101. Each of the two power wires 111 has a connection terminal 111a fixed in the plug holder 11, as shown in FIG. 4.

Figure 4:
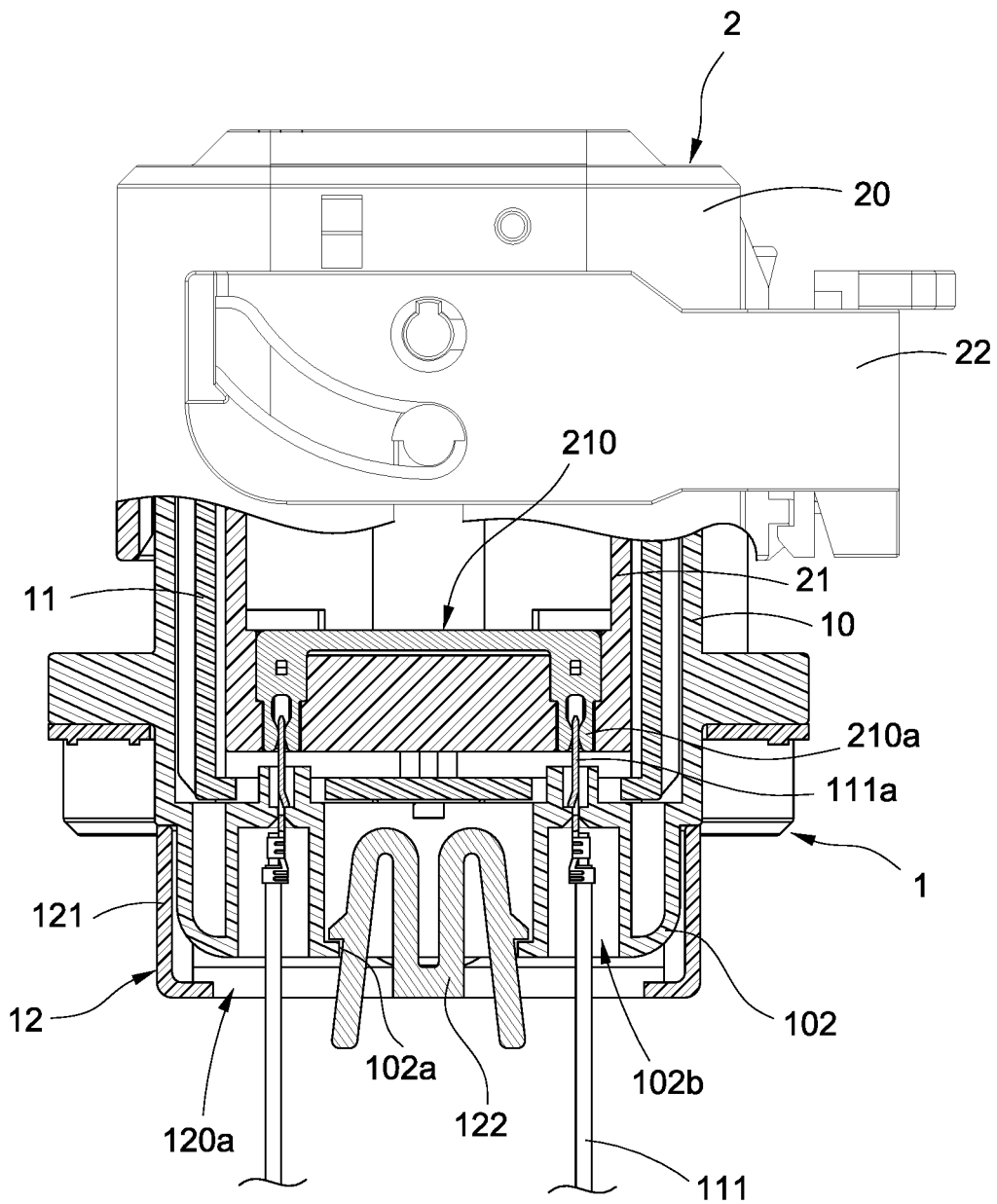
FIG. 4 is a local cross-sectional view of the present disclosure.

As shown in FIGS. 1 and 4, the safety plug assembly 2 is used to plug into the above-mentioned switch seat 1. The safety plug assembly 2 includes a plug portion 20 matching the seat portion 10 of the switch seat 1, a plug head 21 disposed on the plug portion 20, and a handle 22 disposed on the plug portion 20. The plug head 21 is plugged into the plug holder 11. Further, a disconnector 210 is disposed in the plug head 21. A clamping end 210a is extended respectively on two ends of the disconnector 210 such that two connection terminals 111a in the plug holder 11 contact with the clamping end 210a of the disconnector 210 and are electrically conducted to each other when the plug head 21 is plugged into the plug holder 11. In this way, the electric conduction can be achieved. In other words, when the safety plug assembly 2 is unplugged from the switch seat 1, the clamping ends 210a of the disconnector 210 are separated from the two connection terminals 111a in the plug holder 11 to meet the safety requirement by disconnecting the power. In the meantime, the present disclosure further makes the connection terminals 111a of the power wires 111 respectively be in a flake shape and the clamping ends 210a of the disconnector 210 respectively be in an elongated shape such that the clamping ends 210a clamp the connection terminals 111a, as shown in FIG. 4. Thus, the electrical connection between the connection terminals 111a and the clamping ends 210a is more secure.

Figure 5:
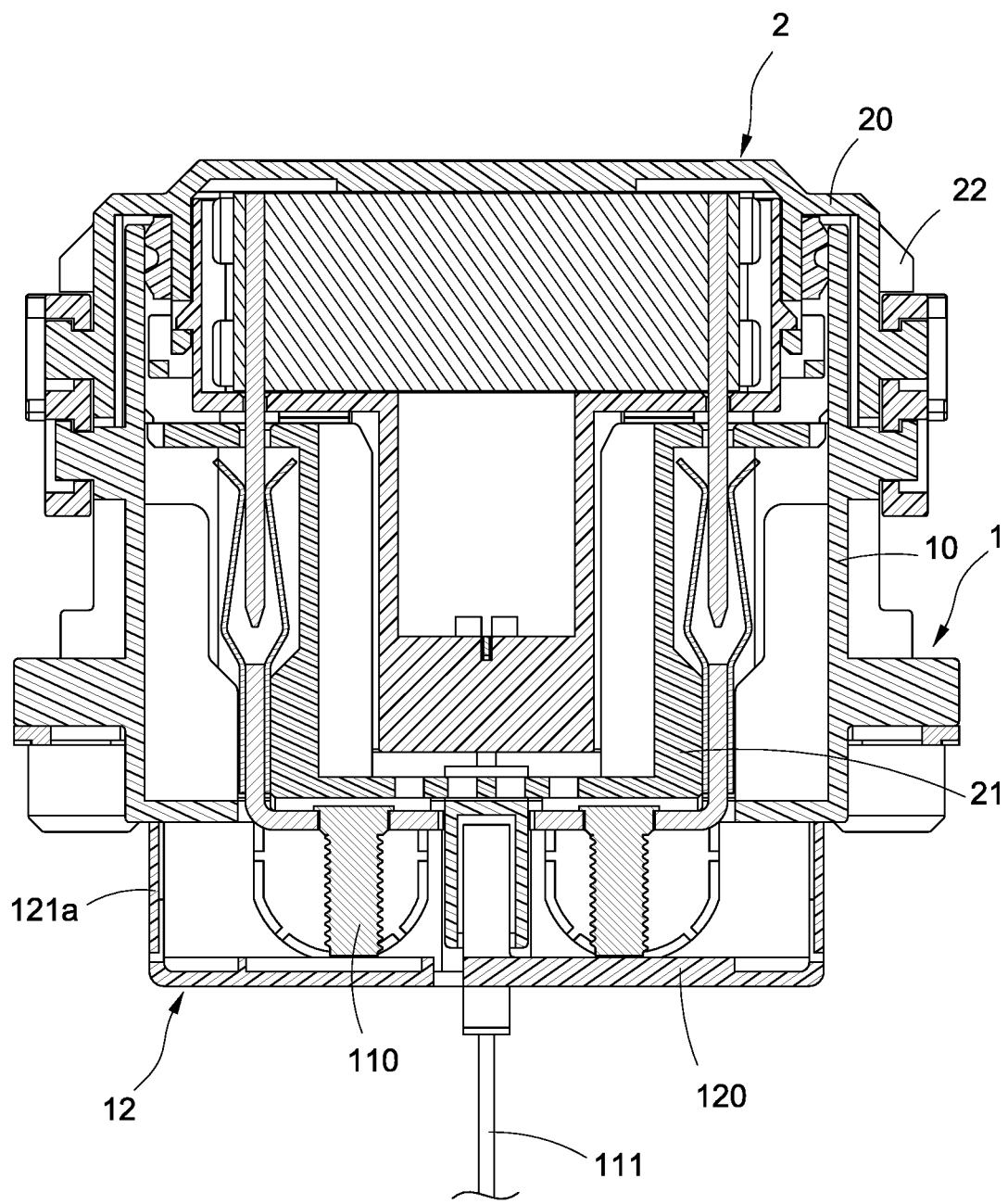
FIG. 5 is a cross-sectional view of the present disclosure from another view.

Please refer to FIGS. 2, 3, and 5. The present disclosure is further provided with a protection cover 12, which is disposed on the seat portion 10 of the switch seat 1 and covers the wire opening 101 such that the power legs 110, which protrude out of the wire opening 101, of the plug holder 11 can be covered in the protection cover 12. Meanwhile, in order to ensure the wire routing of the power wires 111 is not influenced under the condition of adding the protection cover 12, a slot seat 102 is disposed above the wire opening 101 of the seat portion 10 in which the slot seat 102 is configured on the middle portion of the wire opening 101 and straddles the wire opening 101 to divide wire opening 101 into two portions. Moreover, an insert hole 102a and the wire holes 102b are disposed on the slot seat 102. The insert hole 102a is for the protection cover 12 to snap. The wire holes 102b are used for the two power wires 111 to pass through. The protection cover 12 has a cover portion 120 and a wall portion 121 surrounding one edge of the cover portion 120. The cover portion 120 is provided with an opening 120a corresponding to the slot seat 102 and is provided with a snap part 122 hung inside the opening 120a to correspond to the insert hole 102a of the slot seat 102 for snapping such that the protection cover 12 may be connected with the seat portion 10 (see FIG. 4). Moreover, the two power wires 111 pass through the opening 120a and penetrate into the wire holes 102b through two sides of the snap part 122. Such design enlarges the distance between two connection terminals 111a of two power wires 111 used as high voltage terminal and uses the snap part 122 or the slot seat 102 as a separator between two power wires 111 to reduce the risk of the short circuit.

As shown in FIG. 3, one inner edge of the opening 120a further protrudes to form a snap seat 122a such that the snap part 122 is formed from the seat 122a toward inside of the protection cover 12 (see FIG. 4) and a gap 120b is formed between the seat 122a and another inner edge of the opening 120a. The gap 120b is at least greater than the diameter of any of the two power wires 111. In this way, one of the two power wires 111 may pass through the gap 120b to make the two power wires 111 shift to the same side of the opening 120a. Consequently, when the protection cover 12 is removed or assembled, the two power wires 111 are not required to be removed.

Therefore, through the above-described structure, the manual service disconnect for the in-vehicle electric current of the present disclosure is obtained.

Figure 6:
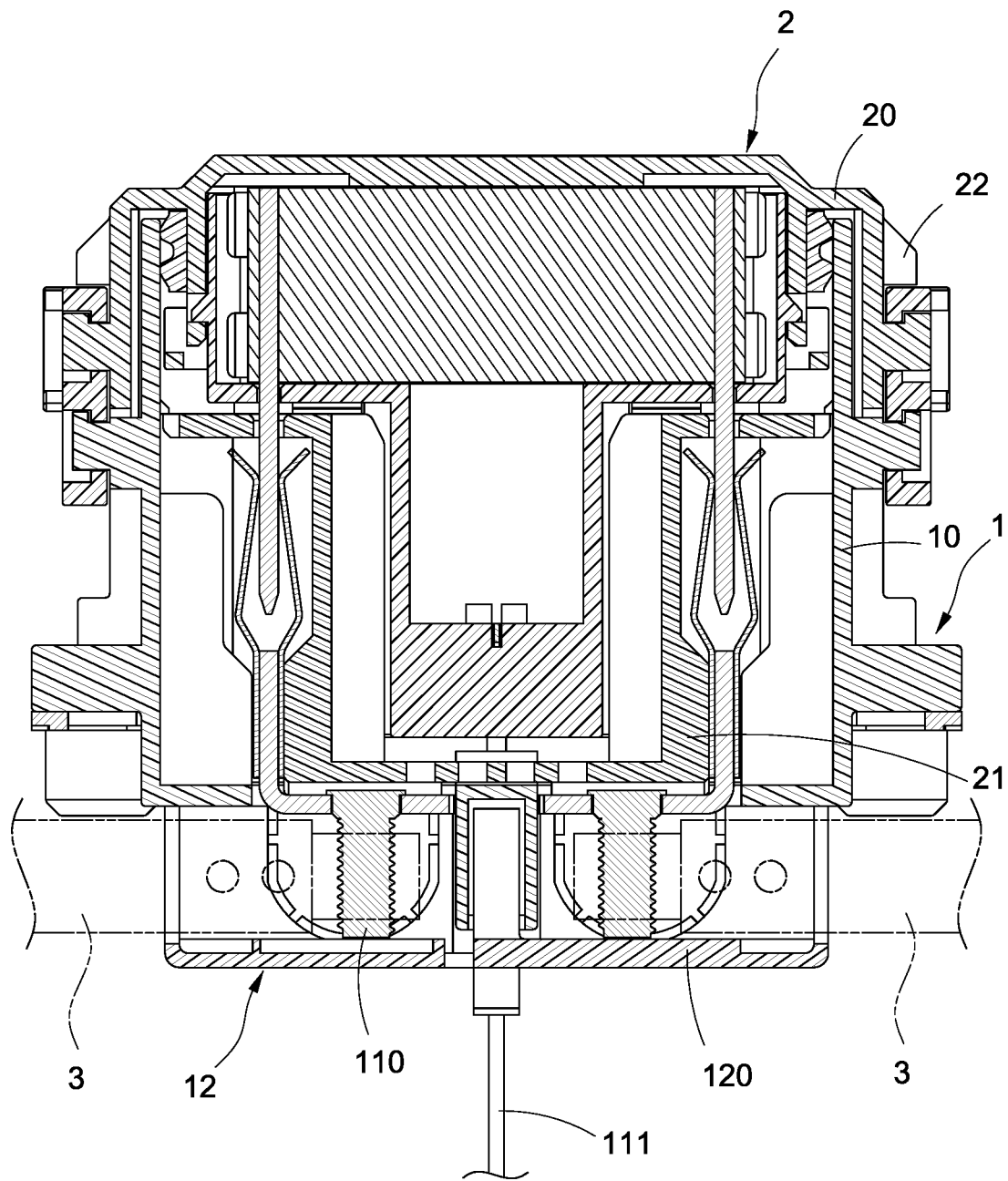
FIG. 6 is a cross-sectional view of the power clamp being clamped of the present disclosure.

As shown in FIGS. 5 and 6, the present disclosure may prevent user from carelessly contacting with the power legs 110 through the cover portion 120 of the protection cover 12. Also, through the pre-rupturing holes on the wall portions 121 of the protection cover 12, the power clamp 3 may pass through the rupturing holes to clamp the power legs 110. In one embodiment, the wall portions 121 is provided with pre-rupturing parts 121a which can be broken to expose the rupturing holes with exerting force. The locations of the rupturing holes on the wall portions 121 may be determined by the user's demand.

In summary, the present disclosure indeed achieves the expected objectives and overcomes the disadvantages of the related art.

While this disclosure has been described by means of specific embodiments, numerous modifications and variations could be made thereto by those skilled in the art without departing from the scope and spirit of this disclosure set forth in the claims.

What is claimed is:

1. A manual service disconnect for an in-vehicle electric current, the manual service disconnect comprising:
   a switch seat, comprising a seat portion and a plug holder, wherein the plug holder comprises a plurality of power legs disposed thereon, and the seat portion is hollow inside and comprises a plug port and a wire opening, and the plug holder is disposed in the seat portion and faces the plug port, and the power legs project from the wire opening;
   a safety plug assembly, comprising a plug portion matching the seat portion and a plug head disposed in the plug portion; and
   a protection cover, disposed on the seat portion and covering the wire opening to cover the power legs,
   wherein the plug holder is disposed for two power wires to be inserted through the wire opening, and each of the two power wires comprises a connection terminal fixed in the plug holder,
   a slot seat is disposed above the wire opening of the seat portion, and an insert hole is disposed on the slot seat for the protection cover to snap,
   the protection cover comprises an opening corresponding to the slot seat and a snap part hung inside the opening for the snap part to snap with the insert hole to make the protection cover connect with the seat portion, and
   a snap seat protrudes from one inner edge of the opening for the snap part to be configured in a manner of from the snap seat toward inside of the protection cover, and a gap is disposed between the snap seat and another inner edge of the opening, and the gap is at least greater than a diameter of any of the two power wires.

2. The manual service disconnect for the in-vehicle electric current according to claim 1, wherein a disconnector is disposed in the plug head, and the connection terminals in the plug holder contact with the disconnector and are electrically conducted with the disconnector.

3. The manual service disconnect for the in-vehicle electric current according to claim 2, wherein a clamping end is extended respectively from two ends of the disconnector and the connection terminals are in a flake shape respectively, and the clamping ends of the disconnector are in an elongated shape and clamp the connection terminals.

4. The manual service disconnect for the in-vehicle electric current according to claim 1, wherein the slot seat is configured on a middle portion of the wire opening and straddles the wire opening, and the wire opening is divided by the slot seat.

5. The manual service disconnect for the in-vehicle electric current according to claim 1, wherein the slot seat further comprises two wire holes for the two power wires to pass through.

6. The manual service disconnect for the in-vehicle electric current according to claim 1, wherein the snap part is disposed between the two power wires.

7. The manual service disconnect for the in-vehicle electric current according to claim 1, wherein the safety plug assembly further comprises a handle disposed on the plug portion.

8. The manual service disconnect for the in-vehicle electric current according to claim 1, wherein the protection cover comprises a cover portion and a wall portion surrounding an edge of the cover portion, and the wall portion comprises a rupturing hole.

9. The manual repairing switch structure for the in-vehicle electric current according to claim 1, wherein the protection cover comprises a cover portion and a wall portion surrounding an edge of the cover portion, and the wall portion comprises a pre-rupturing part.

* * * * *